United States Patent
Ekman

[11] Patent Number: 5,996,624
[45] Date of Patent: Dec. 7, 1999

[54] QUICK-COUPLING DEVICE

[75] Inventor: Thure Ekman, Skövde, Sweden

[73] Assignee: Dart Engineering AG, Zug, Switzerland

[21] Appl. No.: 08/805,025

[22] Filed: Feb. 21, 1997

[30] Foreign Application Priority Data

Feb. 23, 1996 [SE] Sweden ................................. 9600691

[51] Int. Cl.[6] ................................................. F16L 37/28
[52] U.S. Cl. ................................ 137/614.03; 137/614.04
[58] Field of Search ..................... 137/614.03, 614.04, 137/614.05, 614

[56] References Cited

U.S. PATENT DOCUMENTS

| | | | |
|---|---|---|---|
| 2,966,371 | 12/1960 | Bruning | 137/614.03 |
| 3,500,859 | 3/1970 | Pearson | 137/614.05 X |
| 3,897,091 | 7/1975 | McMath . | |
| 4,219,048 | 8/1980 | Ekman . | |
| 4,269,389 | 5/1981 | Ekman . | |
| 4,289,164 | 9/1981 | Ekman . | |
| 4,347,870 | 9/1982 | Maldavs | 137/614.05 |
| 4,447,040 | 5/1984 | Magorien | 137/614.03 X |
| 4,896,697 | 1/1990 | Stromdahl . | |
| 5,398,723 | 3/1995 | Allread et al. | 137/614.03 |
| 5,433,247 | 7/1995 | Guertin . | |

FOREIGN PATENT DOCUMENTS

| | | |
|---|---|---|
| 0034312 | 6/1984 | European Pat. Off. . |
| 30 05 490 | 9/1982 | Germany . |
| 0715899 | 9/1954 | United Kingdom . |
| 1331577 | 7/1973 | United Kingdom . |
| 1495395 | 12/1977 | United Kingdom . |
| 2087019 | 5/1981 | United Kingdom . |
| 2234566 | 3/1989 | United Kingdom . |

*Primary Examiner*—Kevin Lee
*Attorney, Agent, or Firm*—Pollock, Vande Sande & Amernick

[57] ABSTRACT

A quick coupling includes a frame and a valve body which is arranged to be longitudinally displaceable in the frame. An inner sleeve is arranged in the frame to be displaceable relative to both the frame and the valve body. The valve body is centered in the frame with the aid of the bearing unit projecting inwards from the sleeve. The bearing unit is provided with one or more cavities or holes allowing working media to flow through. A rear seal is provided in a seat arranged behind the inner sleeve. A pressure eliminator is also provided behind the inner sleeve.

11 Claims, 1 Drawing Sheet

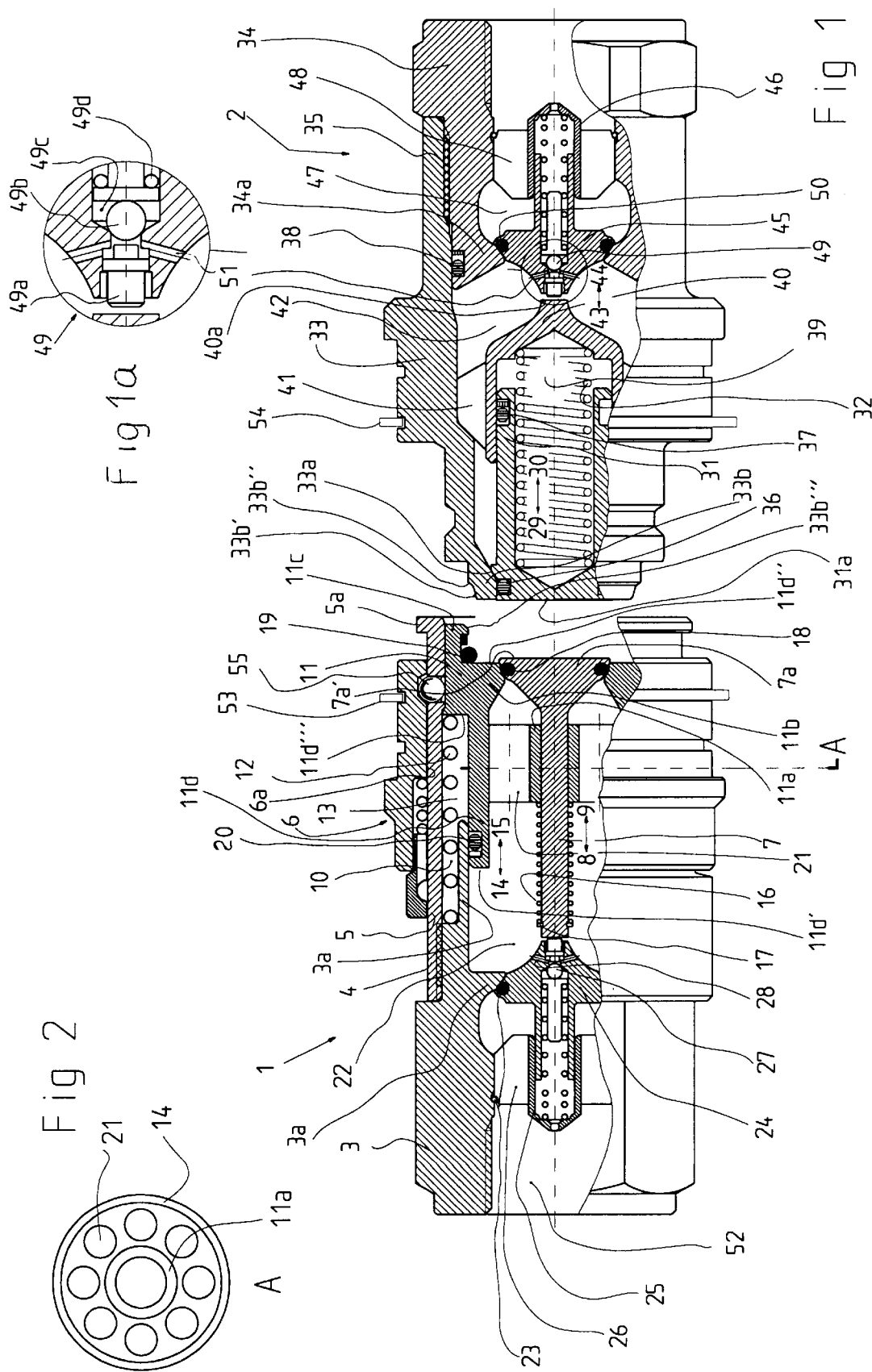

QUICK-COUPLING DEVICE

TECHNICAL FIELD

The present invention relates to a quick-coupling device which comprises two parts that can be coupled together, where the first part comprises a frame and a valve body which is arranged to be longitudinally displaceable in the frame as well as an inner sleeve which is arranged to be longitudinally. displaceable relative to both the frame and the valve body.

DESCRIPTION OF RELATED ART

There are known quick couplings in which at least one coupling part has front and rear sealing functions and in which, upon coupling of the quick-coupling parts, an initial sealing function is effected on the front seal, and the rear sealing function is activated only when the quick-coupling parts have been pushed together to a relatively large extent. It has been proposed, for example, to use of an inner tubular part which can be displaced relative to the frame and which is provided at its ends with inlet and outlet holes for the working medium.

It is known to use an eliminator function in one coupling part or in both coupling parts. It is also known to use a volume-swallowing function, by which is meant that a valve body can be displaced into the coupling part in question with a relatively small actuation force despite the fact that the insertion takes place counter to a constant pressure in the working medium. The insertion in this case takes place in a space in a central part in the coupling part in question. This space is not connected to the working medium pressure, and can have a pressure which is lower than the working medium pressure. The volume which the body thus inserted represents can in this case, be considered to be "swallowed" by the coupling part.

There is a crucial need to use initial effective sealing arrangements in the quick coupling. If it is also required that the quick coupling deal with high pressures, for example 1000 bar or more, it is necessary in addition to use a rear sealing function. Arrangements proposed previously have been found to have problems with their structural stability. The tubular unit mentioned in the introduction is difficult to dimension for sufficient structural stability and for the desired large flow of media through the quick coupling. The object of the present invention is to solve this problem.

It is often important to be able to effect coupling of the quick-coupling parts counter to constant pressure in one or both parts. This assumes the use of a pressure eliminator in one or both of the quick-coupling parts. In addition, there is often a need for a volume-swallowing function in one part. In the case of one quick coupling requiring the initial and rear sealing functions, there are problems in being able to provide both of these sealing functions together with the elimination and volume-swallowing functions, while maintaining a large capacity for the flow of media. The present invention also solves this problem.

In addition, the coupling force must be kept low. The path for the working medium through the coupling must be able to be kept substantially straight with gentle bends and turns so that pressure peaks to be negotiated through the coupling are not distorted or intensified. The invention also solves these problems.

There are also requirements that the male coupling part in certain cases, be made comparatively short, despite the fact that the quick coupling is provided with all the functions mentioned above. In addition, if so desired, it should be possible for known locking arrangements to be used for manually locking the coupling parts in the coupled position. The coupling must be able to be used effectively with both rear and front sealing functions. The rear sealing function seals off the higher pressure, while it is possible, via the actuation of the front seal, to guarantee that there is a complete sealing with regard to spillage before the rear seal is activated. The invention also solves this set of problems.

Furthermore, a it is important to provide a quick coupling with a very high degree of freedom from spillage during coupling and uncoupling. The invention solves this problem too. There is also a need to design each coupling part with fewer parts, among other things for the purpose of providing a more reliable overall function, and this is provided by the invention.

SUMMARY OF THE INVENTION

In the present invention the valve body mentioned in the introduction is centered in the frame by a unit which projects inwards from the sleeve and which is provided with one or more cavities/holes allowing working media to flow through.

In one embodiment, the inner sleeve has, at its outer end, an extension section which, during coupling of the parts extends parallel to an activation section on the second coupling part.

The sections are, in this case, designed with a sealing arrangement which comprises a sealing element arranged between the sections. The activation section is designed with a profile which comprises a front section part of reduced diameter, preferably an outwardly narrowing (cone-shaped) surface and a shoulder part. The provide can address the sealing element in an advantageous manner which contributes to low coupling forces, at the same time as an effective sealing occurs between the element, the sloping surface and the shoulder part, and also the space and end surfaces which are present for the placing of the sealing element in the extension section. In one embodiment, the inner sleeve can be acted upon by a first restoring spring at its parts facing the frame, and a second spring at its parts cooperating with the valve body. The inner sleeve, via the last-mentioned spring, actuates the valve body so that it is held in place or in a desired starting position. The springs have a spring force which can detain the quantity of oil which is present in front of the rear seal, but which does not cause activation of the eliminator function of the coupling by means of the inner sleeve being moved inwards alone.

In another embodiment, the inner sleeve in the first coupling part works in a space behind which a seat is arranged for a rear seal between the valve body and the frame. A first pressure eliminator is in this case arranged in the rear parts of the space. The second coupling part is provided with a frame and a second valve body which is arranged to be displaceable relative to the frame and which, during the coupling of the parts in the quick coupling, can cooperate with the valve body, hereinafter referred to as the first valve body, which is arranged to be longitudinally displaceable in the first coupling part. The second coupling part also comprises a volume-swallowing function in accordance with the description above. The volume-swallowing function is obtained with a central part which is also arranged to be longitudinally displaceable via the frame of the second coupling part.

Behind the central part, in one embodiment, there is arranged a rear sealing function for the working medium. A second pressure eliminator is additionally arranged on the rear sealing function.

In order to keep the coupling forces low, the inner sleeve is designed with small end surface areas. The effect of the pressure of the medium can be kept to a minimum in this way. In one embodiment, the unit projecting inwards from the inner sleeve is arranged fixed or forms part of the material of the inner sleeve. In another embodiment, the holes or cavities which allow the medium through can consist of a ring of holes around the circumference of the unit.

By means of what has been proposed above, it is the present invention provides quick couplings having initial and rear sealing functions. By virtue of the invention, it is possible in one embodiment to design an environmentally friendly quick coupling having a coupling counter to constant pressure in both the coupling parts, low coupling forces, spillage-free coupling and uncoupling, large flow areas, etc., despite the fact that the coupling has relatively small external dimensions. The coupling can also be designed for self-supporting coupling using one hand. In one illustrative embodiment, the novel female coupling is simple to assembly. A rear valve pack is first applied to its frame. The front valve pack and the ball race are then applied. Compared to the known couplings, it is possible, by means of the invention, to reduce the coupling in question by one spring and a dust or protective cover.

BRIEF DESCRIPTION OF THE FIGURES

A presently proposed embodiment of a device having the characteristics pertaining to the invention will be described hereinbelow with reference to the attached drawing, in which:

FIG. 1 shows, in longitudinal cross-section, the coupling parts included in a quick coupling, FIG. 1a shows, on an enlarged scale, the pressure-eliminating function according to FIG. 1, and FIG. 2 shows an end view of an inner sleeve included in one coupling part.

DETAILED DESCRIPTION OF THE INVENTION

FIG. 1 shows a female part 1 and a male part 2 included in a quick coupling. The female part has a frame with a rear frame part 3 and a tubular frame part 5 which is secured to the latter via screw threads 4. A ball race arrangement 6 is arranged on the part 5. A first valve body 7 is arranged to be longitudinally displaceable in the directions of the arrows 8–9 in the frame part 5. The frame part 3 has a forwardly projecting part 3a which extends parallel to the frame part 5 so as to form an intermediate space 10. An inner sleeve is indicated by 11 and is acted upon, so as to assume a starting position according to the figure, by a spring function, for example in the form of a first spring 12, which is arranged in the space 10 and a space 13 connected thereto between the outside of the sleeve 11 and the inside of the frame part 5. The frame part 5 has an outwardly projecting flange 5a which forms the end position for the ball race 6 in the coupled state of the coupling parts 1 and 2.

The design of the inner sleeve 11 is crucial. On its inside the sleeve is provided with a bearing part 11a for the valve body 7. The sleeve is longitudinally displaceable in the directions of the arrows 14–15 counter to the action of the spring 12 relative to the valve body and the frame 3, 3a, 5. The displacement also takes place counter to the action of a second spring function, for example a spring 16, which bears against a stop 17 on the valve body 7 and a surface on the bearing part 11a. The second spring function 16 has the effect that the first valve body 7 is assigned its longitudinal displacement position shown in FIG. 1. The displacement of the valve body inwards into the coupling part 1 receives a force from the inner sleeve via the spring 16 since the inner sleeve is moved inwards in the coupling relative to the valve body. This force must not lead to actuation of the eliminator described hereinbelow.

The sleeve also has a seat part 11b for a first seal 18 which is included in an initial seal in the coupling part 1. The seal 18 is arranged in the valve body 7, on a widened part 7a. The sleeve 11 is also provided with an extension section 11c which bears a second seal 19 included in the initial seal. The sleeve 11 also has a seal (O-ring with back-up) 20 at its rear section 11d. The section lid comprises an end surface 11d' exposed to the pressure of the working medium in the first coupling part, and a second actuation surface 11d'' can be acted upon by means of the second coupling part. The sleeve 11 also has an actuation surface 11d''' for the spring 12. The bearing unit 11a has continuous cavities/holes 21 for the working medium which can thus pass internally through the sleeve 11 from one side to the other, or vice versa, in a space 22 in the first coupling, in which space the sleeve works.

In the rear parts of the space 22, the frame 3 is arranged with a seat part 3a for a rear seal 23. A second valve body arranged to be longitudinally displaceable (in the directions of the arrows 8–9) is included in the rear sealing function. The body 24 is mounted in a central part 25 which is centered in the frame by means of three or four wings 26. In the rear parts of the space 22, and on the sealing function with the seal 23, there is arranged a pressure-eliminating function which can have a known pressure eliminator 27. Any overpressure on either side of the seal 23 is eliminated via one or more channels 28.

The male part 2 comprises a valve body 31 which is arranged to be longitudinally displaceable in the directions of the arrows 29–30 and whose outer position according to FIG. 1 is determined by a restoring function, for example a spring 32, and also a frame part 33 on the second coupling part 2. The frame part 33 has a stop surface 33a for the body 31. The coupling part 2 also has a second frame part 34 which is held together with the first frame part via threaded connections 35. The valve body 31 has a seal 36 at its front end, and a seal 37 with back-up function at its rear end. The frame parts 33 and 34 are also sealed off by a seal 38 with back-up function.

The valve body 31 is mounted in a recess 39 which is included in a centrally mounted unit 40, which is centered with three or more wing-shaped elements in a space 42 for working media in the coupling part 2. The unit 40 is mounted such that it is longitudinally displaceable in the directions of the arrows 43–44. In the same way as the coupling part 1, the second coupling part has a second valve body 45 which is arranged to be longitudinally displaceable (in the directions of the arrows 43–44) and which is mounted in a central part 46 which is in turn centered in the recess 47 of the frame by means of three or more wings 48. There is also an eliminator function which can be provided using a pressure eliminator 49. The frame part 34 supports a seat for the valve body 45 which is provided with a seal 50. The eliminator function eliminates an overpressure on either side of the sealing function 50 via one or more channels 51. The recesses 39 have a lower pressure than that existing in the space 42. The space behind the seal 23 in the first coupling part is designated by 52. The pressure eliminator 49 can be of a known type which comprises a pin 49a, which can be acted upon by a surface 40a on the part 40 (according to FIG. 1). The actuation of the pin 49a in turn leads to the actuation of a body 49b which is thus lifted. Channels 51 are thus placed in communication with a space 49c for the bearing of the body 49b. The body (the ball) is acted upon to the sealing position by a spring 49d, with lifting taking place counter to the action of the latter. The communication leads to the overpressure in the space 49c, i.e. in the space 47, being eliminated.

The frame part 33 has at its front an actuation section 33b which extends parallel to the extension section 11c during coupling of the coupling parts 1 and 2. The section 33b has a part of reduced diameter comprising a sloping, outwardly narrowing surface 33b'and a step 33b'. An actuation surface on the section 33b'is designated by 33b'". The valve body 31 has an actuation surface 31a and the valve body 7 has a corresponding actuation surface 7a'.

FIG. 2 shows that the cavities 21 according to FIG. 1 can be designed as a ring of holes arranged around the entire circumference of the unit 11a.

Upon coupling of the coupling parts 1 and 2, an initial effective seal is obtained between the coupling parts by the seal 19 and the surface 33b' and the step 33b". This sealing function and guide function is obtained effectively by the extension and actuation sections 11c and 33b. The actuation surfaces 7a' and 31a on the valve bodies 7 and 31 and the surfaces 11d" and 33b" on the inner sleeve 11 and the frame 33, respectively, thus come into cooperation with one another. The movable inner sleeve 11 and the valve body 31 (easily movable by virtue of the volume-swallowing function) can thus be pushed inwards into the parts 1 and 2, respectively. The front seals 18 and 36 are in this case freed. The sealing function guarantees a high degree of freedom from spillage.

Continued pushing together of the coupling parts 1 and 2 results in the actuation of the eliminator function, 27 or 49, in the coupling part 1 or 2 whichever has the lowest working medium pressure at the time of coupling. When the pressure has been eliminated by the eliminator function in question, further pushing together can take place, whereupon the is activated and the pressure in the space in question, 49 or 27, is eliminated. The closure procedure is the opposite and it is also dependent on the highest pressure in the coupling parts 1 or 2. The uncoupling procedure remains free from spillage to a very high degree.

The ball race 6 is displaced relative to the frame 5 from the position shown in FIG. 1 when the coupling is pushed together. The displacement can take place by an external control function via actuation member 53. There is a corresponding actuation member 54 on the second coupling part 2 in order to permit fixing of the mutual displacement positions between the coupling parts. The balls are held in the shown in FIG. 1 by means of the inner sleeve 11. Upon coupling, the inner sleeve is pushed inwards and away from the balls. The frame part 33 is pushed in under the balls 55. In the final coupling position of one or more cavities which can cooperate with the balls are situated under the balls and can receive the latter. Upon continued displacement of the ball race towards the end position, which is defined by the protruding flange 5a, the balls are pressed down by the lower surface 6a of the ball race, and the coupling parts 1 and 2 are in this way locked to one another until the ball race is displaced relative to the frame part 5 with the aid of the actuation members 53, 54, whereupon the opposite procedure takes place in accordance with the above.

The inner sleeve 11 has a small end surface 11d'which can be exposed to the pressure of the media and it is designed in such a way that an essentially straight path can be maintained for the flow of media through the inside of the sleeve. The sleeve has a straight tubular part and a surface which is cone-shaped and widens outwards towards the free end. Opposite the cone-shaped surface, on the outside of the sleeve, is the surface which can cooperate with the balls and which at the front merges into the extension section. The surface finishes at the rear in the form of an annular radial surface for the spring 12 to bear on.

The invention is not limited to the embodiment which has been shown hereinabove by way of example, but can instead be modified within the scope of the following patent claims and the inventive concept.

I claim:

1. A quick-coupling comprising first and second parts which can be coupled together, said first part comprising:
   a frame;
   a valve body arranged in said frame to be longitudinally displaceable with respect to said frame;
   an inner sleeve arranged in said frame to be longitudinally displaceable with respect to both said frame and said valve body;
   a bearing unit arranged in said frame, said bearing unit projecting inwards from said inner sleeve and supporting said valve body so that said valve body is substantially centered in said frame, said bearing unit having at least one hole which allows working medium to flow through;
   a seat arranged in said frame behind said inner sleeve;
   a rear seal arranged in said seat; and
   a first pressure eliminator arranged in said frame behind said inner sleeve.

2. The quick coupling of claim 1 wherein said inner sleeve has an extension section on its side portion facing the mating end of said first part, said extension section extending parallel to an activation section on said second part during coupling of said first and second parts, wherein said activation and extension sections are sealed with a sealing element.

3. The quick coupling of claim 2 wherein said activation section has an outwardly narrowing surface and a shoulder, said sealing element bearing against an inner surface on said shoulder during sealing.

4. The quick-coupling of claim 1 further comprising:
   a first spring element acting on a portion of said inner sleeve facing said frame; and
   a second spring element acting on said bearing unit whereby said bearing unit actuates said valve body to its starting position.

5. The quick coupling of claim 1 wherein said inner sleeve is adapted to allow said working medium to flow through in a substantially straight path via an inside surface of said inner sleeve.

6. The quick coupling of claim 1 wherein said inner sleeve is placed in a female coupling part.

7. The quick-coupling of claim 1 wherein said inner sleeve further comprises a protective sleeve arranged to prevent foreign particles from penetrating into the coupling part.

8. The quick-coupling of claim 1 wherein a front surface area of said inner sleeve which cooperates with said second part during coupling essentially corresponds to a rear surface area of said inner sleeve which is acted upon by said working medium.

9. A quick-coupling comprising first and second parts which can be coupled together, said first part comprising:

a first frame;

a first valve body arranged in said first frame to be longitudinally displaceable with respect to said first frame;

an inner sleeve arranged in said first frame to be longitudinally displaceable with respect to said first frame and said first valve body;

a bearing unit in said first frame, said bearing unit projecting inwards from said inner sleeve and supporting said first valve body so that said first valve body is substantially centered in said first frame, said bearing unit having at least one hole which allows working medium to flow through;

said second part comprising:

a second frame;

a second valve body arranged in said second frame to be longitudinally displaceable with respect to said second frame, said second valve body cooperating with said first valve body during coupling of said first and second parts;

a central unit arranged in said second frame to be longitudinally displaceable with respect to said second frame, said central unit defining a second space therein and a first space between said central unit and said second frame, a second valve unit being displaceable into said second space whereby the displacement of said second valve body is not dependent on a pressure of the working medium is said first space.

10. The quick coupling of claim 9 further comprising:

second rear sealing members arranged behind said central unit; and a second pressure eliminator arranged on said second rear sealing members.

11. A quick-coupling comprising first and second parts which can be coupled together, said first part comprising:

a frame;

a valve body arranged in said frame to be longitudinally displaceable with respect to said frame;

an inner sleeve arranged in said frame to be longitudinally displaceable with respect to said frame and said valve body;

said inner sleeve having a bearing portion projecting inward from said inner sleeve and supporting said valve body so that said valve body is substantially centered in said frame, said bearing portion having a plurality of holes around its circumference which allow working medium to flow through;

a first spring acting on said inner sleeve to hold said inner sleeve in a starting position;

a second spring acting on said bearing portion, said second spring being arranged behind said bearing portion.

* * * * *